(12) United States Patent
Mann (10) Patent No.: US 8,661,160 B2
(45) Date of Patent: Feb. 25, 2014

(54) BIDIRECTIONAL RECEIVE SIDE SCALING

(75) Inventor: Eric K. Mann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1929 days.

(21) Appl. No.: 11/513,516

(22) Filed: Aug. 30, 2006

(65) Prior Publication Data

US 2008/0077792 A1   Mar. 27, 2008

(51) Int. Cl.
*G06F 15/16* (2006.01)

(52) U.S. Cl.
USPC .................. 709/246; 709/223; 709/228

(58) Field of Classification Search
USPC ......... 709/250, 223, 224, 227, 228, 230, 246; 713/160
See application file for complete search history.

(56) References Cited

U.S. PATENT DOCUMENTS

| | | |
|---|---|---|
| 6,389,468 B1 | 5/2002 | Muller et al. |
| 6,453,360 B1 | 9/2002 | Muller et al. |
| 6,483,804 B1 | 11/2002 | Muller et al. |
| 6,484,209 B1 | 11/2002 | Momirov |
| 6,650,640 B1 | 11/2003 | Muller et al. |
| 6,683,873 B1 | 1/2004 | Kwok et al. |
| 6,973,040 B1 | 12/2005 | Ricciulli |
| 7,043,494 B1 | 5/2006 | Joshi et al. |
| 7,162,740 B2 | 1/2007 | Eastlake, III |
| 7,219,228 B2 | 5/2007 | Lin |
| 7,529,242 B1 | 5/2009 | Lyle |
| 7,620,046 B2 | 11/2009 | Ronciak et al. |
| 7,669,234 B2 | 2/2010 | Buer |
| 2002/0055980 A1 * | 5/2002 | Goddard .................. 709/217 |
| 2002/0144004 A1 | 10/2002 | Gaur et al. |
| 2003/0043810 A1 | 3/2003 | Boduch et al. |
| 2003/0043825 A1 | 3/2003 | Magnussen et al. |
| 2003/0226032 A1 | 12/2003 | Robert |
| 2004/0030757 A1 | 2/2004 | Pandya |
| 2004/0240447 A1 * | 12/2004 | Dorbolo et al. ............ 370/392 |
| 2005/0091412 A1 * | 4/2005 | Pinkerton et al. .......... 709/250 |
| 2005/0182841 A1 | 8/2005 | Sharp |
| 2006/0034310 A1 | 2/2006 | Connor |
| 2006/0083227 A1 | 4/2006 | Eldar |
| 2006/0085554 A1 | 4/2006 | Shah et al. |
| 2006/0285494 A1 | 12/2006 | Li et al. |
| 2007/0127581 A1 | 6/2007 | Connor et al. |
| 2007/0234310 A1 | 10/2007 | Zhang et al. |
| 2008/0077792 A1 | 3/2008 | Mann |
| 2009/0007150 A1 | 1/2009 | Li et al. |
| 2010/0091774 A1 | 4/2010 | Ronciak et al. |
| 2011/0142050 A1 * | 6/2011 | Li et al. .................... 370/392 |

FOREIGN PATENT DOCUMENTS

EP          1367799 A2      12/2003

OTHER PUBLICATIONS

"Scalable Networking: Eliminating the Receive Processing Bottleneck-Introducing RSS", Windows Hardware and Driver Central, WinHEC 2004 Version, Apr. 14, 2004, 17 Pages.

(Continued)

*Primary Examiner* — Phuoc Nguyen (57) ABSTRACT

In an embodiment, a method is provided. The method of this embodiment provides in response to receiving a packet, determining a packet tuple; generating a hash result by performing a commutative hash function on the packet tuple; and processing the packet on one of a plurality of processors based, at least in part, on the hash result.

10 Claims, 5 Drawing Sheets

(56) References Cited

OTHER PUBLICATIONS

Merry, "Zero Copy Sockets and NFS Code for FreeBSD," Jun. 16, 2000, 6 pages, available at: <http://www.mail-archive.com/freebsd-current@freebsd.org/msg17038.html>.
Office Action received for U.S. Appl. No. 10/957,001, mailed on Oct. 5, 2007, 14 pages.
Office Action received for U.S. Appl. No. 10/957,001, mailed on Apr. 16, 2008, 10 pages.
Office Action received for U.S. Appl. No. 10/957,001, mailed on Dec. 16, 2008, 10 pages.
Office Action received for U.S. Appl. No. 12/587,045, mailed on Dec. 8, 2010, 12 pages.
Office Action received for U.S. Appl. No. 11/513,516, mailed on Nov. 10, 2010, 4 pages.
"FreeBSD/Linux Kernel Cross Reference sys/netinet/tcp.sub.—syncache.c," 2001 Networks Associates Technology, Inc., 25 pages.
Office Action received for U.S. Appl. No. 12/215,288, mailed on Dec. 21, 2010, 13 pages.
DAEMON9, "Project Neptune", Phrack Magazine, vol. 7, Issue 48, file 13 of 18, Jul. 1996, 14 pages.
"Intel IXP2400 Network Processor hardware Reference Manual," Nov. 2003, 408 pages.
Reutsche, "The Architecture of a Gb/s Multimedia Protocol Adapter", Computer Communication Review ACM SIGCOMM, vol. 23, No. 3, Jul. 1993, pp. 59-68.
Steenbergen, "Understanding Modern Denial of Service," Oct. 28, 2001, 5 pages.
International Preliminary Report on Patentability received for PCT Patent Application No. PCT/US2005/044771, mailed on Jun. 28, 2007, 8 pages.
Lemon, "Resisting SYN Flood DoS Attacks with a SYN Cache," USENIX Association, Berkley, CA, 2002, 9 pages.
"RSS 2.0 Specification", Internet technology hosted by Berkman Center, Jul. 15, 2003, 6 pages, available at: <http://cyber.law.harvard.edu/rss/rss.html>.
Girouard, "Patch for Common Networking Error Messages", Jun. 16, 2003, 22 pages, available at: <http://oss.sgi.com/archives/netdev/2003-06/msg00474.html>.
"Tcp syn cache cleanup code for sc->sc_so", e-mail extract sent to Thorpe, Jason, Aug. 21, 1999, 1 page, available at: <http://mail-index.netbsd.org/tech-net/1999/08/21/0001.html>.
International Search Report and Written Opinion received for PCT Patent Application No. PCT/US2005/044771, mailed on May 8, 2006, 8 pages.
Sapuntzakis et al., "The Case for RDMA," Cisco Systems, Dec. 2000, 13 pages, available at: <http://suif.stanford.edu/~csapuntz/draft-csapuntz-caserdma-00.txt>.
Minturn et al. "Addressing TCP/IP Processing Challenges Using the IA and ISP Processors," Communications Processing, Intel Technology Journal, vol. 7, Issue 4, Nov. 14, 2003, pp. 39-50.
"FreeBSD/Linux Kernel Cross Reference sys/sys/queue.h," 1991, 1993, The Regents of the University of California, available at: <http://fxr.watson.org/fxr/source/sys/queue.h>, retrieved on Jun. 16, 2011, 11 pages.
Office Action received for U.S. Appl. No. 12/215,288, mailed on Jul. 12, 2010, 13 pages.

* cited by examiner

BIDIRECTIONAL RECEIVE SIDE SCALING

FIELD

Embodiments of this invention relate bidirectional receive side scaling.

BACKGROUND

Multi-processor systems have become commonplace in the last few years, enabling multiple concurrent processes in the system to achieve higher speed networking. To achieve optimal use of this architecture, a technology known as receive side scaling (hereinafter "RSS") may be used to enable receive-processing to scale with the number of available computer processors by allowing the network load from a network controller to be balanced across multiple processors. An implementation of RSS is introduced by Microsoft® Corporation (hereinafter MS® RSS), and is described in "Scalable Networking: Eliminating the Receive Processing Bottleneck—Introducing RSS", WinHEC (Windows Hardware Engineering Conference), Apr. 19, 2005 (hereinafter "the WinHEC Apr. 19, 2005 white paper"). MS® RSS is part of the Network Device Interface Specification (hereinafter "NDIS") 6.0, available from Microsoft® Windows®. NDIS 6.0 provides for a device driver that enables a single network controller to support multiple network protocols, or that enables multiple network controllers to support multiple network protocols. NDIS 6.0 is currently still in the works, but information about it is available from Microsoft® Corporation of Redmond, Wash.

In MS® RSS implementations, a hash result may be generated by performing a hash function over a packet tuple obtained from a packet received over a network. Typical uses of MS® RSS are implemented on endpoint systems, that is, systems in which traffic is terminated at the system in which MS® RSS is implemented. MS® RSS is used in these systems to balance large numbers of network flows evenly over multiple queues for network processing. The MS® RSS hash function is cryptographically secure—not only is it difficult to predict the hash result of any given packet tuple, but also swapping the individual inputs of any of the packet tuples does not result in the same hash result. As such—a remote system cannot a priori determine what hash value will be calculated from any given packet tuple, and hence cannot deliberately or accidentally overload internal queues as a side-effect of the hash calculation.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples are described in detail, or where one or more examples are provided, it should be understood that the examples are not to be construed as exhaustive, and are not to be limited to embodiments of the invention to the examples described and/or illustrated.

Figure 1:
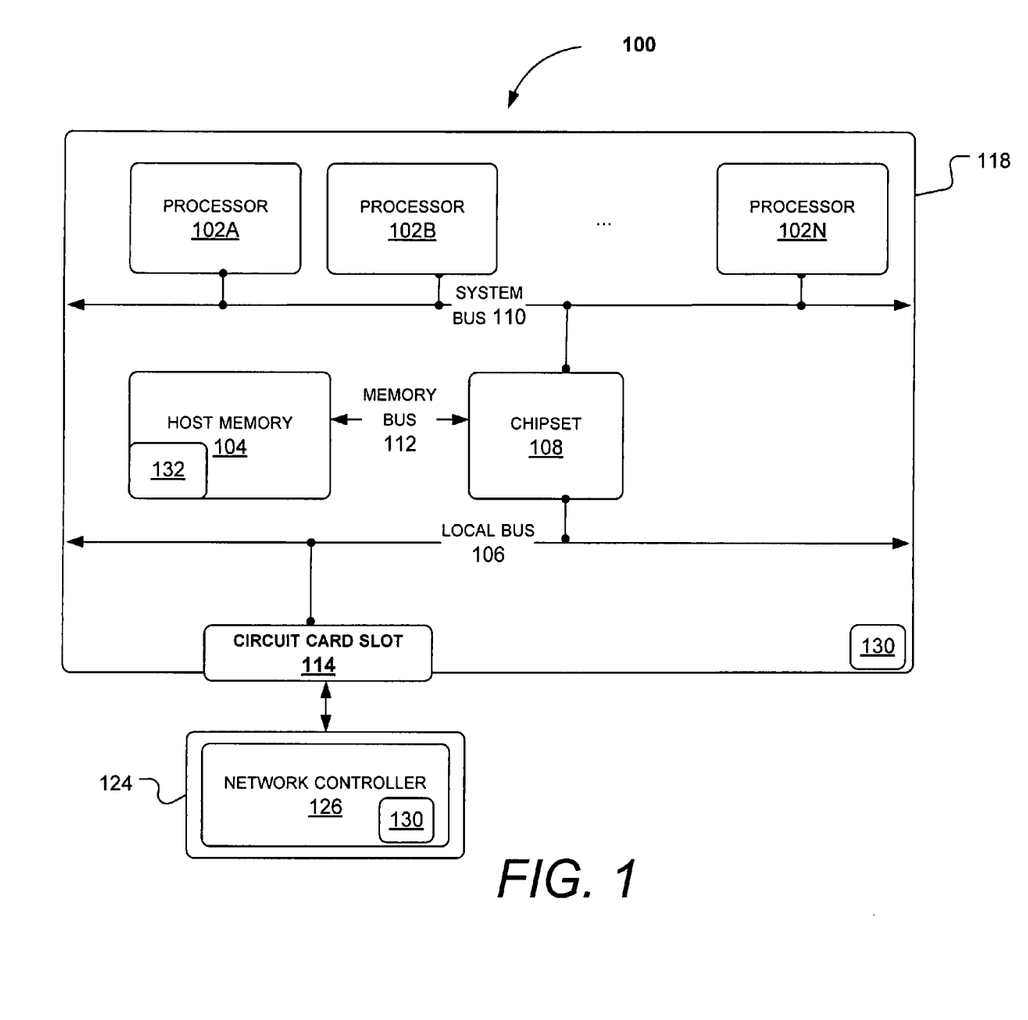
FIG. 1 illustrates a system according to an embodiment.

FIG. 1 illustrates a system in an embodiment. System 100 may comprise one or more processors 102A, 102B, ..., 102N, host memory 104, busses 106, 110, 112 and network controller 126. System 100 may comprise more than one, and/or other types of memories, buses, and network controllers; however, those illustrated are described for simplicity of discussion. Processors 102A, 102B, ..., 102N, host memory 104, and busses 106, 110, 112 may be comprised in a single circuit board, such as, for example, a system motherboard 118. System 100 may comprise for example, a hub, switch, router, or end station. In an embodiment, system 100 may comprise a firewall system designed to examine ingoing and outgoing packets to prevent unauthorized access of a network, such as an intranet. While examples described herein may refer to a firewall system, embodiments of the invention are not limited in this respect, and it should be understood by one of ordinary skill in the art that embodiments of the invention have wider applicability than those described, which are intended to provide examples of embodiments of the invention.

A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry. A processor may alternatively comprise a multi-core processor having a plurality of computational engines. Alternatively, a processor may comprise a computational engine that may be comprised in the multi-core processor, where an operating system may perceive the computational engine as a discrete processor with a full set of execution resources. Other possibilities exist.

System may comprise logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in machine-executable instructions 132 stored in a memory, such as memory 104, to perform these operations. Alternatively or additionally, logic 130 may be embodied in firmware. Logic may be comprised in various components of system 100, including network controller 126, chipset 108, processors 102A, 102B, ..., 102N, and/or on motherboard 118. Logic 130 may be used to perform various functions by various components as described herein.

Chipset 108 may comprise one or more integrated circuit chips, such as those selected from integrated circuit chipsets commercially available from the assignee of the subject application (e.g., graphics, memory, and I/O controller hub chipsets), although other one or more integrated circuit chips may also, or alternatively, be used. According to an embodiment, chipset 108 may comprise an input/output control hub (ICH), and/or a memory control hub (MCH), although embodiments of the invention are not limited by this. Chipset 108 may comprise a host bridge/hub system that may couple processor 102A, 102B, 102N, and host memory 104 to each other and to local bus 106. Chipset 108 may communicate with memory 104 via memory bus 112 and with processors 102A, 102B, . . . , 102N via system bus 110. In alternative embodiments, processors 102A, 102B, . . . , 102N and host memory 104 may be coupled directly to bus 106, rather than via chipset 108.

Local bus 106 may comprise a bus that complies with the Peripheral Component Interconnect (PCI) Local Bus Specification, Revision 2.2, Dec. 18, 1998 available from the PCI Special Interest Group, Portland, Ore., U.S.A. (hereinafter referred to as a "PCI bus"). Alternatively, for example, bus 106 may comprise a bus that complies with the PCI Express Base Specification, Revision 1.0a, Apr. 15, 2003 available from the PCI Special Interest Group (hereinafter referred to as a "PCI Express bus"). Bus 106 may comprise other types and configurations of bus systems.

Network controller 126 may be comprised in a circuit card 124 (i.e., network interface card or NIC) that may be inserted into a circuit card slot 114. A "network controller" as referred to herein relates to a device which may be coupled to a data transmission medium to transmit data to or receive data from other devices coupled to the data transmission medium. For example, a network controller may be designed to transmit data to or receive data from devices coupled to a network such as a local area network. Such a network controller may communicate with the other devices according to any one of several data communication formats such as, for example, communication formats according versions of IEEE Std. 802.3 (Ethernet), IEEE Std. 802.11, IEEE Std. 802.16, Universal Serial Bus, Firewire, asynchronous transfer mode (ATM), synchronous optical network (SONET) or synchronous digital hierarchy (SDH) standards. In alternative embodiments, a network controller may comprise any one of other I/O devices such as, for example, a controller to a data storage system. However, these are merely examples of a network controller and embodiments of the present invention are not limited in these respects.

Network controller 126 may comprise logic 130 to perform operations described herein as being performed by network controller 126 and/or system 100. When circuit card 124 is inserted into circuit card slot 114, bus connector (not shown) on circuit card slot 114 may become electrically and mechanically coupled to bus connector (not shown) on circuit card 124. When these bus connectors are so coupled to each other, logic 130 in circuit card 124 may become electrically coupled to bus 106. When logic 130 is electrically coupled to bus 106, any of processors 102A, 102B, . . . , 102N may exchange data and/or commands with logic 130 via bus 106 that may permit one or more processors 102A, 102B, . . . , 102N to control and/or monitor the operation of logic 130. Rather than reside on circuit card 124, network controller 126 may instead be comprised on system motherboard 118. Alternatively, network controller 126 may be integrated into chipset 108.

Host memory 104 may store machine-executable instructions 132 that are capable of being executed, and/or data capable of being accessed, operated upon, and/or manipulated by logic, such as logic 130. Host memory 104 may, for example, comprise read only, mass storage, random access computer-accessible memory, and/or one or more other types of machine-accessible memories. The execution of program instructions 132 and/or the accessing, operation upon, and/or manipulation of this data by logic 130 for example, may result in, for example, system 100 and/or logic 130 carrying out some or all of the operations described herein.

Figure 2:
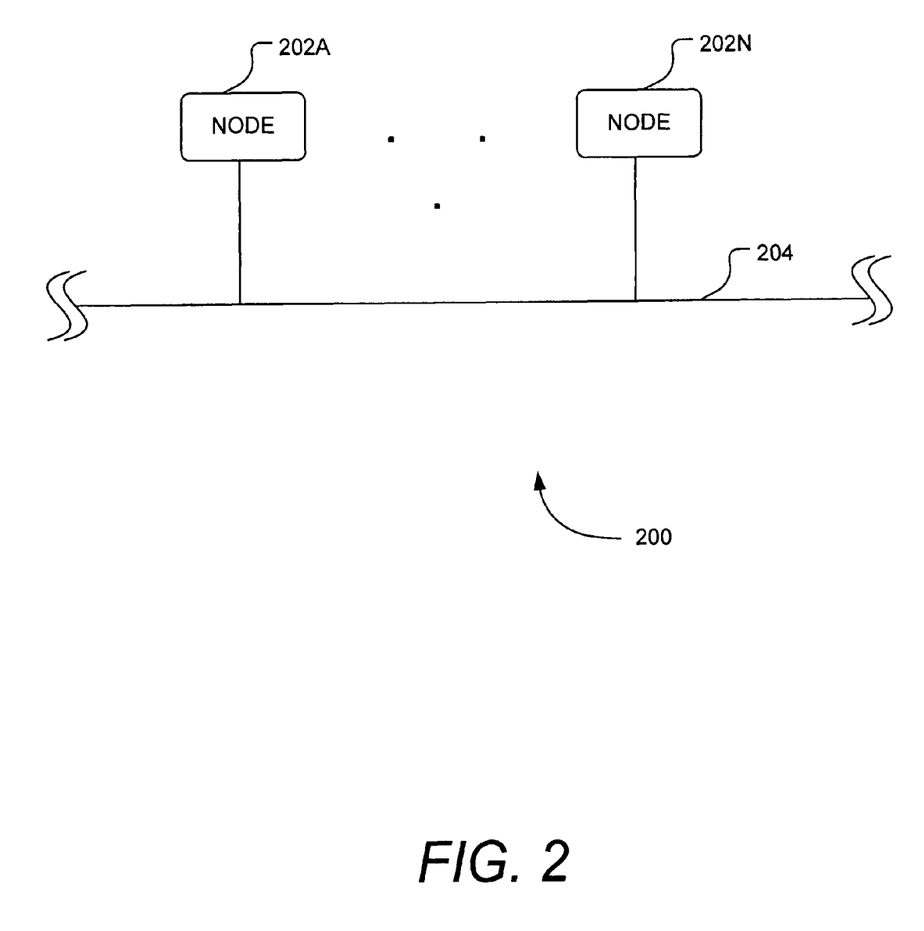
FIG. 2 illustrates a network according to an embodiment.

FIG. 2 illustrates a network 200 in which embodiments of the invention may operate. Network 200 may comprise a plurality of nodes 202A, . . . 202N, where each of nodes 202A, . . . , 202N may be communicatively coupled together via a communication medium 204. Nodes 202A . . . 202N may transmit and receive sets of one or more signals via medium 204 that may encode one or more packets. Communication medium 104 may comprise, for example, one or more optical and/or electrical cables, although many alternatives are possible. For example, communication medium 104 may comprise air and/or vacuum, through which nodes 202A . . . 202N may wirelessly transmit and/or receive sets of one or more signals.

In network 200, one or more of the nodes 202A . . . 202N may comprise one or more intermediate stations, such as, for example, one or more hubs, switches, and/or routers; additionally or alternatively, one or more of the nodes 202A . . . 202N may comprise one or more end stations. Also additionally or alternatively, network 200 may comprise one or more not shown intermediate stations, and medium 204 may communicatively couple together at least some of the nodes 202A . . . 202N and one or more of these intermediate stations. Of course, many alternatives are possible.

Figure 3:
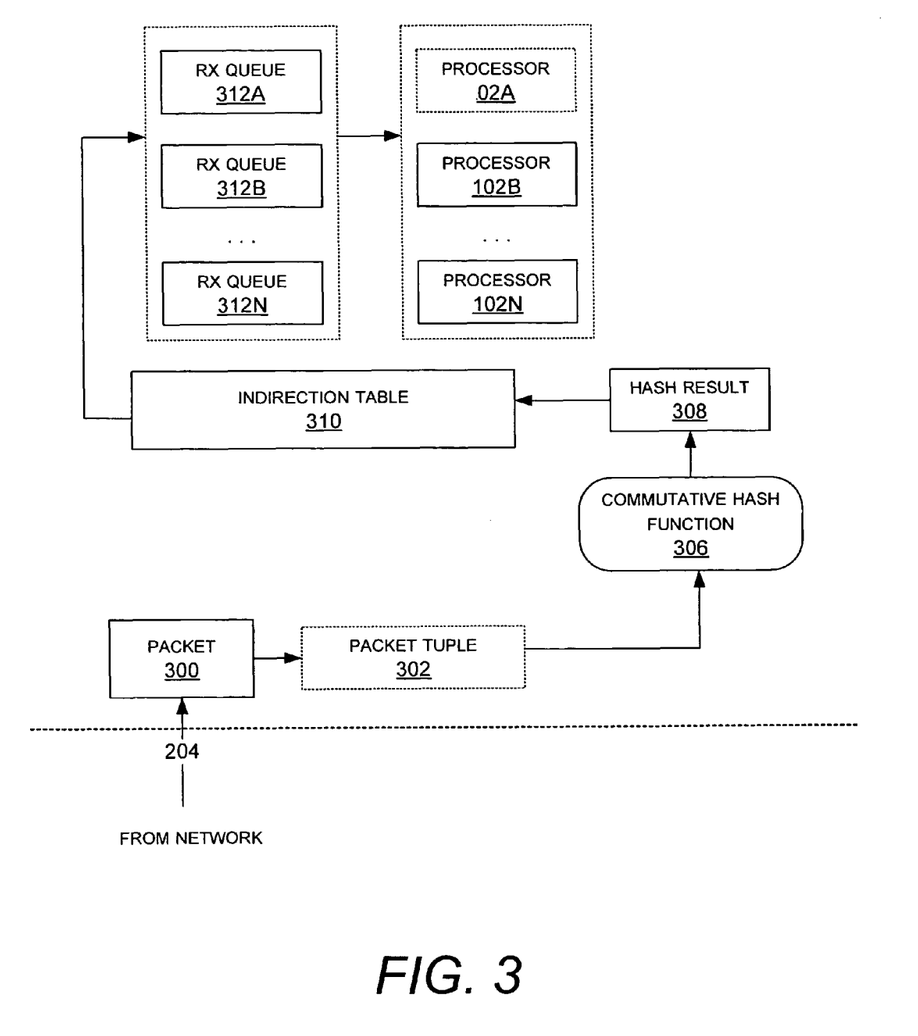
FIG. 3 is a block diagram that illustrates a system according to an embodiment.

FIG. 3 is a block diagram in accordance with an embodiment of the invention. In an embodiment, indirection table 310, and commutative hash function 306 may be implemented on network controller 126, and receive queues 312A, 312B, . . . , 312N may be implemented in host memory 104. However, embodiments are not limited in this respect, and other configurations may be possible.

In an embodiment, packet 300 may be received on communication medium 204 over a network by network controller 126. After receipt of packet 300, a connection context may be established between the transmitting system and the receiving system. A connection context refers to information that may be used by a computer to manage information about a particular connection. For example, when a transmitting system establishes a connection with a receiving system, the connection context may comprise one or more connection parameters including, for example, source address, destination address, local port, and remote port. Likewise, when receiving system transmits a packet to transmitting system, a connection context may be established on the transmitting system. The connection contexts established between a specific transmitting system and receiving system are referred to herein as a flow.

For example, if transmitting system's (source) IP address=10.0.0.2 (0x0a000001 in Base-16 representation), and source port number=1024; and if receiving system's (destination) IP address=10.0.0.1 (0x0a000002 in Base-16 representation), and destination port number=80, then a packet from transmitting system to receiving system may have the following connection context: (DEST_IP_ADDRESS=10.0.0.1, SRC_IP_ADDRESS=10.0.0.2, DEST_PORT=80, SRC_PORT=1024). Conversely, a packet from receiving system (back) to transmitting system may have the following connection context: (DEST_IP_ADDRESS=10.0.0.2, SRC_IP_ADDRESS=10.0.0.1, DEST_PORT=1024, SRC_PORT=80). While the connection contexts are different, the endpoints are the same. Therefore, the communication between the endpoints refer to the same flow.

Referring back to FIG. 3, network controller 126 may examine packet 300 to obtain packet tuple 302 comprising network address identifiers (source and destination) and network port identifiers (source and destination). Network address identifier may comprise an IP (Internet Protocol) address, and network port identifier may comprise a port number to which a physical or a virtual connection may be assigned for receiving packets on the system.

A commutative hash function 306 may be performed over packet tuple 302 to generate a hash result 308. "Commutative hash function" refers to a hash function in which the hash function performed over a first set of values is equal to the hash function performed over a second set of values, where the second set of values comprises a swapped set of the first set of values. For example, a commutative hash function C_HASH may satisfy the following property:

C_HASH (DEST_IP_ADDRESS, SRC_IP_ADDRESS, DEST_PORT, SRC_PORT)=C_HASH (SRC_IP_ADDRESS, DEST_IP_ADDRESS, SRC_PORT, DEST_PORT).

For example, a hash function C_HASH may comprise:

C_HASH (MIN (DEST_IP_ADDRESS, SRC_IP_ADDRESS), MAX(DEST_IP_ADDRESS, SRC_IP_ADDRESS), MIN(DEST_PORT, SRC_PORT), MAX(DEST_PORT, SRC_PORT), where MIN represents a minimum value, and MAX represents a maximum value.

For example, referring to the example provided above (i.e., DEST_IP_ADDRESS=10.0.0.1=0x0a000001, DEST_PORT=80, SRC_IP_ADDRESS=10.0.0.2=0x0a000002, and SRC_PORT=1024), then:

MIN(DEST_IP_ADDRESS, SRC_IP_ADDRESS)= 0x0a000001;
MAX(DEST_IP_ADDRESS, SRC_IP_ADDRESS)= 0x0a000002;
MIN(DEST_PORT, SRC_PORT)=80; and
MAX(DEST_PORT, SRC_PORT)=1024.

Thus, if packet A is associated with connection context (DEST_IP_ADDRESS=10.0.0.1=0x0a000001, SRC_IP_ADDRESS=10.0.0.2=0x0a000002, DEST_PORT=80, SRC_PORT=1024), the inputs to C_HASH may be:

C_HASH(0x0a000001, 0x0a000002, 80, 1024).

Upon receiving packet B having the connection context (DEST_IP_ADDRESS=10.0.0.2=0x0a000002, SRC_IP_ADDRESS=10.0.0.1=0x0a000001, DEST_PORT=1024, SRC_PORT=80), the inputs to C_HASH for both connection context result in:

C_HASH(0x0a000001, 0x0a000002, 00, 1024), thereby resulting in C_HASH being a commutative hash function for the same flow.

Other examples of hash functions that meet this property include existing 16-bit 1's complement addition used for IP, TCP (Transport Control Protocol), and UDP (User Datagram Protocol) checksum operations for checksum offloads by a network controller. Using addition would span the parameter fields listed in the example commutative hash function above. However, any combination of addition, multiplication, and exclusive OR operations, for example, can be used if it meets the property described above. Other possibilities exist.

Hash result 308 may be mapped to one of receive queues 312A, 312B, . . . , 312N in indirection table 310. Indirection table 310 may comprise a plurality of entries, where each entry comprises a value to which hash result 308 may be mapped, and each value may correspond to an identifier of one of plurality of receive queues 312A, 312B, . . . , 312N. Each of receive queues 312A, 312B, . . . , 312N may correspond to one of plurality of processors 102A, 102B, . . . , 102N, and may queue packets 200 for a corresponding one of the processors 102A, 102B, . . . , 102N.

Figure 4:
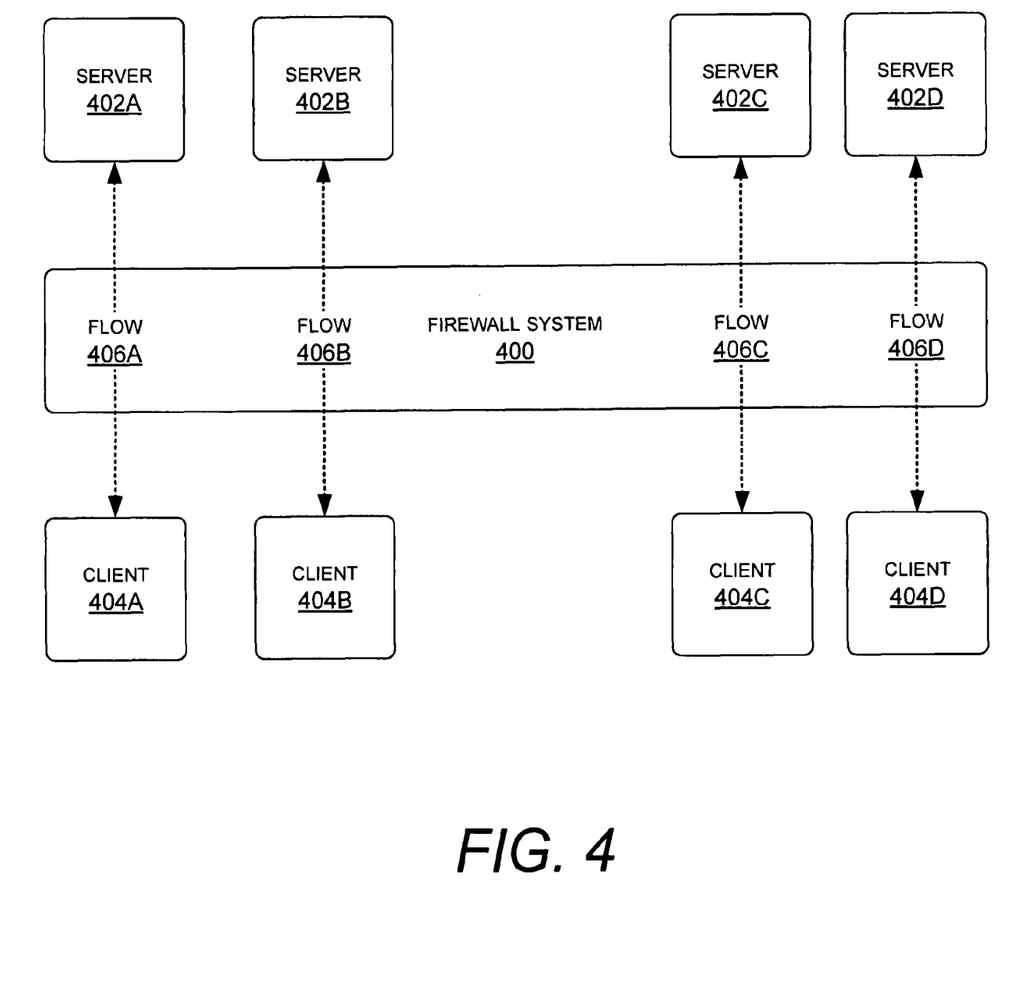
FIG. 4 is a block diagram that illustrates a system according to an embodiment.

FIG. 4 illustrates an embodiment of the invention. In FIG. 4, firewall system 400 may comprise one of nodes 202A, . . . , 202N in network 200, for example, to examine ingoing and outgoing packets to prevent unauthorized access of a network, such as an intranet. In this example, firewall 400 may provide protection to clients 404A, 404B, 404C, 404D, where any of clients 404A, 404B, 404C, 404D may request data that may be serviced by any of servers 402A, 402B, 402C, 402D. When one of clients 404A, 404B, 404C, 404D requests data from a server 402A, 402B, 402C, 402D, the request may pass through firewall 400, and a flow 406A, 406B, 406C, 406D may be established between one of clients 404A, 404B, 404C, 404D, and one of servers 402A, 402B, 402C, 402D. This flow may be maintained for the scenario when the server 402A, 402B, 402C, 402D from which data was requested sends data back to the client 404A, 404B, 404C, 404D.

For example, flow 406A may be established and maintained for communications between client 404A and server 402A; flow 406B may be established and maintained for communications between client 404B and server 402B; flow 406C may be established and maintained for communications between client 404C and server 402C; and flow 406D may be established and maintained for communications between client 404D and server 402D. To minimize synchronization overhead and data structure caching within processor 102A, 102B, . . . , 102N caches for the same flows, packets belonging to the same flow 406A, 406B, 406C, 406D may be hashed to the same processor 102A, 102B, . . . , 102N in embodiments of the invention by using commutative hash function 206.

Figure 5:
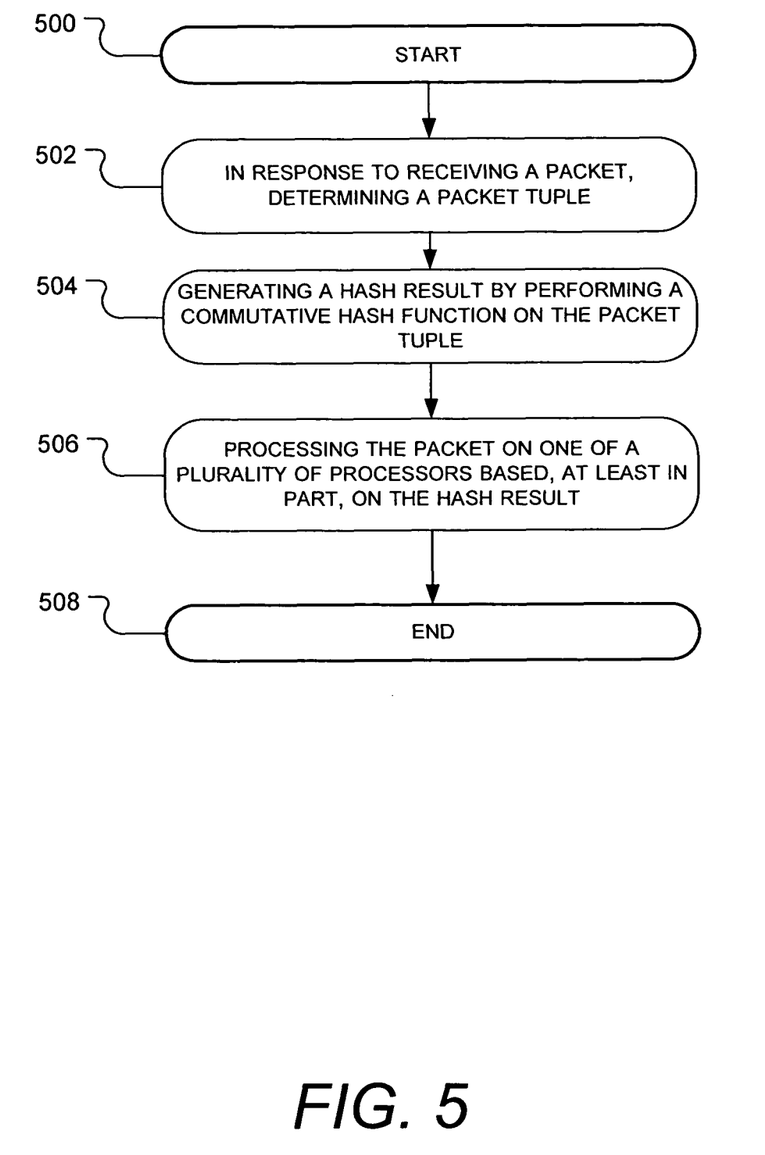
FIG. 5 is a flowchart illustrating a method according to an embodiment.

FIG. 5 illustrates a method in accordance with an embodiment of the invention. The method begins at block 500 and continues to block 502 where the method may comprise in response to receiving a packet, obtaining a packet tuple. For example, packet tuple 502 from packet 300 may comprise an IP source address, IP destination address, source port identifier, and destination port identifier.

At block 504, the method may comprise generating a hash result by performing a commutative hash function on the packet tuple. The properties of a commutative hash function are such that the commutative hash function performed over the packet tuple generate the same hash result when the commutative hash function is performed over a different permutation of the packet tuple. In an embodiment, the different permutation comprises swapping the source network address identifier with the destination network address identifier, and swapping the source port number with the destination source number. As described above, FIG. 4 illustrates one environment in which it may be useful to hash packets 200 belonging to the same flow to the same processor.

At block 506, the method may comprise processing the packet on one of a plurality of processors based, at least in part, on the hash result. In an embodiment, this would comprise selecting one of a plurality of receive queues 312A, 312B, . . . , 312N by mapping the hash result 308 to one of the plurality of receive queues in an indirection table 310, the selected receive queue 312A, 312B, . . . , 312N corresponding to a processor 102A, 102B, . . . , 102N, and placing the packet on the selected receive queue 312A, 312B, . . . , 312N to await processing by the processor 102A, 102B, . . . , 102N. In other implementations, it is possible that indirection table 310 may comprise a hash result 308 to processor 102A, 102B, . . . , 102N mapping rather than a hash result 308 to receive queue 312A, 312B, . . . , 312N mapping.

The method may end at block 508.

CONCLUSION

Therefore, in an embodiment, a method may comprise in response to receiving a packet, determining a packet tuple; generating a hash result by performing a commutative hash function on the packet tuple; and processing the packet on one of a plurality of processors based, at least in part, on the hash result.

Embodiments of the invention may enable receive side scaling of packets to a plurality of processors to be processed bidirectionally. Current implementations of receive side scaling, such as MS® RSS, assume that traffic is terminated at a system in which the scaling is performed. In certain systems, where it may be useful to send all packets belonging to the same flow to the same processor, this is not necessarily true. Since MS® RSS is cryptographically secure (i.e., swapping the source network address with the destination network address; and swapping the source port number with the destination port number does not result in the same hash result), packets belonging to the same flow will not hash to the same processor. Using a content addressable memory (CAM) by using a lookup of tuples is a possibility, but may be expensive, and limited in the number of flows that it can store. In embodiments of the invention, a commutative hash function may be used to hash packets belonging to the same flow to the same processor. The commutative hash function is such that swapping the source network address with the destination network address, and swapping the source port number with the destination port number results in the same hash result, thereby allowing packets to be hashed to the same processor if those packets belong to the same flow.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method, comprising:
for a first packet received by a network controller of a system comprising multiple processors:
based on the magnitude of an Internet Protocol source address and an Internet Protocol destination address of the first packet, swapping values of the Internet Protocol source address and the Internet Protocol destination address;
based on the magnitude of a source port and a destination port of the first packet, swapping values of the source port and the destination port;
performing a first hash based, at least in part, on the swapped values of the Internet Protocol source address and the Internet Protocol destination address and on the swapped values of the source port and the destination port;
determining a first processor from the multiple processors based on the performed first hash; and
for a second packet received by the network controller:
performing a second hash based, at least in part, on values of an Internet Protocol source address and an Internet Protocol destination address of the second packet and on values of a source port and a destination port of the second packet; and
determining the same first processor from the multiple processors based on the performed second hash as the first processor determined based on the performed first hash; and
wherein the second packet belongs to a same bidirectional connection as the first packet, wherein the destination address of the second packet is the source address of the first packet.

2. The method of claim 1, wherein the determining the first processor comprises using the first performed hash to perform a lookup associating hash values with indications of processors.

3. The method of claim 1, wherein the determining the first processor comprises selecting a queue associated with the first processor.

4. A computer program, disposed on a non-transitory computer readable medium, comprising instructions to cause circuitry to:
for a first receive packet:
based on the magnitude of an Internet Protocol source address and an Internet Protocol destination address of the first receive packet, swap values of the Internet Protocol source address and the Internet Protocol destination address;
based on the magnitude of a source port and a destination port of the first receive packet, swap values of the source port and the destination port;
perform a first hash based, at least in part, on the swap values of the Internet Protocol source address and the Internet Protocol destination address and on the swap values of the source port and the destination port;
determine a first processor from multiple processors based on the performed first hash; and
for a second receive packet:
perform a second hash based, at least in part, on values of an Internet Protocol source address and an Internet Protocol destination address of the second receive packet and on values of a source port and a destination port of the second receive packet; and
determine the same first processor from the multiple processors based on the second hash as the first processor determined based on the first hash; and
wherein the second packet belongs to a same bidirectional connection as the first packet, wherein the destination address of the second packet is the source address of the first packet.

5. The computer program of claim 4, wherein the instructions to cause circuitry to determine the first processor comprise instructions to cause circuitry to use the first hash to perform a lookup associating hash values with indications of processors.

6. The computer program of claim 4, wherein the determining the first processor comprises selecting a queue associated with the first processor.

7. A system, comprising
multiple processors;
at least one network controller controller coupled to the multiple processors; and
circuitry to:
for a first receive packet:
based on the magnitude of an Internet Protocol source address and an Internet Protocol destination address of the first receive packet, swap values of the Internet Protocol source address and the Internet Protocol destination address;
based on the magnitude of a source port and a destination port of the first receive packet, swap values of the source port and the destination port;
perform a first hash based, at least in part, on the swap values of the Internet Protocol source address and the Internet Protocol destination address and on the swap values of the source port and the destination port;
determine a first processor from multiple processors based on the performed first hash; and for a second receive packet:
: perform a second hash based, at least in part, on values of an Internet Protocol source address and an Internet Protocol destination address of the second receive packet and on values of a source port and a destination port of the second receive packet; and
: determine the same first processor from the multiple processors based on the second hash as the first processor determined based on the first hash; and
: wherein the second packet belongs to the same bidirectional connection as the first packet, wherein the destination address of the second packet is the source address of the first packet.

8. The system of claim 7, wherein the circuitry to determine the first processor comprise circuitry to use the first hash to perform a lookup associating hash values with indications of processors.

9. The system of claim 7, wherein the determining the first processor comprises selecting a queue associated with the first processor.

10. The system of claim 7, wherein the circuitry comprises circuitry programmed by instructions disposed on a non-transitory computer readable medium.

\* \* \* \* \*